(12) United States Patent
Gradev

(10) Patent No.: US 11,025,781 B2
(45) Date of Patent: Jun. 1, 2021

(54) DIGITAL ON-DUTY ASSISTANT

(71) Applicant: SAP SE, Walldorf (DE)

(72) Inventor: Martin Nikolov Gradev, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/662,768

(22) Filed: Oct. 24, 2019

(65) Prior Publication Data

US 2021/0127012 A1    Apr. 29, 2021

(51) Int. Cl.
*H04M 3/00* (2006.01)
*H04M 5/00* (2006.01)
*H04M 3/523* (2006.01)
*H04M 3/51* (2006.01)

(52) U.S. Cl.
CPC ....... *H04M 3/5235* (2013.01); *H04M 3/5183* (2013.01)

(58) Field of Classification Search
CPC .......................... H04M 3/5183; H04M 3/5235
USPC .................................................... 379/265.09
See application file for complete search history.

(56) References Cited

U.S. PATENT DOCUMENTS

| | | | | |
|---|---|---|---|---|
| 7,536,437 B2 * | 5/2009 | Zmolek | ................... | H04L 63/08 |
| | | | | 709/206 |
| 8,108,516 B2 * | 1/2012 | Zmolek | ................. | H04L 61/306 |
| | | | | 709/224 |
| 10,110,511 B2 * | 10/2018 | Miller | ................... | H04L 67/327 |
| 10,601,995 B2 * | 3/2020 | Feast | ....................... | G06Q 10/10 |
| 2003/0154293 A1 * | 8/2003 | Zmolek | ................. | H04L 61/106 |
| | | | | 709/228 |
| 2009/0024601 A1 * | 1/2009 | Zmolek | ................. | H04L 61/106 |
| 2016/0277315 A1 * | 9/2016 | Miller | ..................... | H04L 67/18 |
| 2019/0140977 A1 * | 5/2019 | Miller | ................. | G06F 16/9537 |
| 2019/0158671 A1 * | 5/2019 | Feast | .................. | G06Q 10/0633 |

* cited by examiner

*Primary Examiner* — Khai N. Nguyen
(74) *Attorney, Agent, or Firm* — Sterne, Kessler, Goldstein & Fox P.L.L.C.

(57) ABSTRACT

System, method, and various embodiments for providing a digital on-duty assistant are described herein. An embodiment operates by receiving a support request from a customer over a communication channel. A channel type corresponding to the communication channel over which the support request was received is identified. Which of a plurality of support specialists is assigned to service the support request over the channel type is identified. Contact information, corresponding to the channel type, for the identified support specialist is determined. The support request is forwarded to the identified support specialist based on the contact information corresponding to the channel type of the communication channel.

18 Claims, 4 Drawing Sheets

DIGITAL ON-DUTY ASSISTANT

BACKGROUND

Many technological and business systems require support specialists to be available to handle customer inquiries and requests, particularly those requests that cannot be handled by an automated system. However, routing support requests to the proper support personnel and scheduling and re-scheduling the various support personnel or specialists to ensure that customer requests are appropriately handled can be difficult and confusing.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a digital on-duty assistant.

Figure 1:
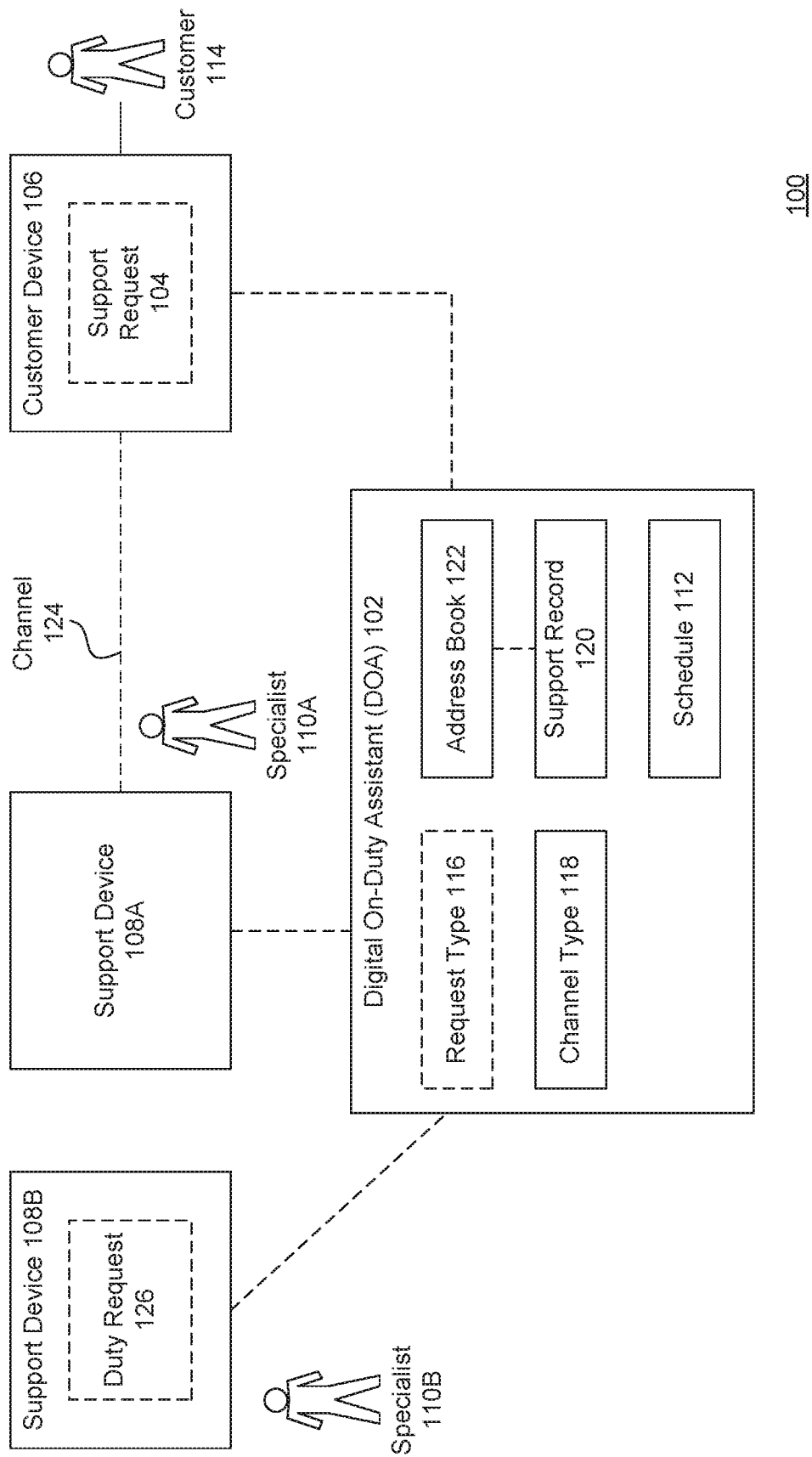
FIG. 1 is a block diagram illustrating example functionality for providing a digital on-duty assistant (DOA), according to some embodiments.

FIG. 1 is a block diagram 100 illustrating example functionality for providing a digital on-duty assistant (DOA) 102, according to some embodiments.

Many technological and business systems require support specialists to be available to handle customer inquiries and requests, particularly those requests that cannot be handled by an automated system. However, routing support requests to the proper support personnel and scheduling and re-scheduling the various support personnel or specialists to ensure that customer requests are appropriately handled can be difficult and confusing. DOA 102 and other embodiments described herein address these and other issues.

DOA 102 receives and routes support requests 104 from a customer 114 to support personnel or specialists 110A, 110B who are trained or assigned to handle the various support requests 104 received from customers 114. DOA 102 also manages an on-duty schedule 112 for the support specialists 110 and enables the specialists 110 to more easily update and inquire about their individual and group schedules. DOA 102 further ensures that when changes are made to the schedule 112 or to contact information for the specialists 110, the support requests 104 from customers 114 are routed accordingly.

Support specialists 110A, 110B may be individuals, employees, contractors, or other personnel who are trained to respond to client and customer inquiries and requests for help with various topics. For example, a first specialist 110A may be trained or assigned to handle technical questions from customers 114 about how to set up, troubleshoot, or operate a particular software application or device. Meanwhile, a second specialist 110B may handle purchases, returns, or accounting and billing issues. In other embodiments, multiple specialists 110 may be on duty at the same time and assigned to handle the same type of support requests 104.

Support request 104 may be any electronic contact or telecommunications between a customer 114 and a company or organization. Support request 104 may include a phone call, email, text message, chat message, video chat request, or other form of electronic or telecommunication. Support request 104 may include any request that is to be handled by an actual person (specialist 110) and not an automated system. In an embodiment, support request 104 may include interactions that were transferred by an automated system. For example, customer 114 may initially call into an automated system that determines that the customer support request 104 requires a person or is escalated to a specialist 110, and may transfer support request 104 to DOA 102.

In an embodiment, a customer 114 may use a customer device 106 to submit a support request 104 to DOA 102. The customer device 106 may be an individual's own personal telephone, mobile phone, laptop, or other communications or computing device. Specialists 110A, 110B may handle support requests 104 from a support device 108A, 108B. Support device 108A, 108B may be an individual's own or company assigned telephone, mobile phone, laptop, or other communications or computing device.

In an embodiment, multiple specialists 110 may share the same support device 108A. For example, a first specialist 110A may be responsible for handling customer inquiries or support requests from 9:00 am-5:00 pm using an assigned telephone 108 and/or computer 108. Then a second specialist 110A may be assigned the same office location or equipment to handle support requests from 5:00 pm-12:00 am. In such a situation, the telephone numbers for the two support specialists 110 may be the same (in address book 122), and their personal chat handles or email identifiers may be different. In another embodiment, the specialists may share the same chat identifier contact information as well: help@support.com.

In an embodiment, customer 114 may submit a chat request 104 using their laptop computer 106 to help@support.com, and DOA 102 may route the chat request 104 to the corresponding specialist 110A chat handle based on a schedule 112 of which specialist 110 is available to assist the customer 114.

Customer 114 may be an employee, customer, client, prospective customer, end user, or any person who requires or requests the assistance of a support specialist 110. As noted above, support request 104 may be a phone call, text message, chat message, video message request, or other method of communication by which customer 114 is requesting assistance, including messaging through a mobile app or webpage associated with a particular organization or company.

DOA 102 may receive and route support requests 104 from different customers 114 to one or more specialists 110 who are identified as being responsible for handling the various requests 104. For simplicity sake, only a single customer 114 is illustrated in the example of FIG. 1, but it is understood DOA 102 is capable of receiving and handling multiple simultaneous support requests 104 from different customers 114 from various devices 106 which are to be routed to various support specialists 110.

In an embodiment, DOA 102 may determine which specialist 110 handles the request 104 based on a support record 120. Support record 120 may indicate which support specialist 110 is available to receive or handle the support request 104 and their corresponding contact information. For example, support record 120 may include an identification of which individuals of a team of specialists 110 are on-duty at the current time, along with their most up-to-date contact information. Then, for example, based on support record 120, DOA 102 may appropriately forward or route support requests 104 to the proper specialist 110.

In an embodiment, DOA 102 may assemble support record 120 using information from both a schedule 112 and an address book 122. Schedule 112 may be a spreadsheet, table, file, set of files, or other data structure that indicates when various employees, personnel, or other specialists 110 are on-duty, on-call, or are otherwise available to receive support requests 104. In an embodiment, schedule 112 may include a name and/or employee identifier by which to identify the various specialists 110, and may provide the dates and times when they are available.

In an embodiment, schedule 112 may include the methods of communication by which the specialists 110 are available on a particular day or date. For example, specialists 110A may be available by email from 5:00 am-7:00 am, by chat from 7:00 am-9:00 am, and by email, chat, or telephone from 9:00 am-5:00 pm.

In an embodiment, schedule 112 may include an indication as to what areas, topics, or department in which a specialist 110 is specialized or trained to handle. For example, a first specialist 110A may be assigned to handle word processing issues, while a second specialist 110B handles spreadsheet issues. Or a first specialist 110A handles technical matters, while a second specialist 110B is trained to respond to financial matters. In another embodiment, the department attribute may be stored in address book 122 or retrieved from another source and imported into support record 120. A specialist 110 may be a general specialist who can receive any different type of support request 104.

Address book 122 may include contact information for the various specialists 110 of a particular company or organization. The contact information may include mailing address, phone number(s), pager number, textual chat identifier, video chat identifier, email address, or other information corresponding to one or more different communication channels through which a customer 114 may communicate with a specialist 110.

A table illustrating an example support record 120 with scheduling and contact information retrieved from both schedule 112 and address book 122 is provided below.

TABLE 1

An Example Customer Support Record

| Time | Name | Specialty 1 | Specialty 2 | Contact |
|---|---|---|---|---|
| 1:00-2:00 pm | Dev R | Application 1 | Application 2 | dr@email.com<br>555-555-5555<br>Video: Devr1<br>Chat: DevR2 |
| 1:00-2:00 pm | Suzy Q | Device 1 | General | Chat: SuzzzyQ |
| 2:00-3:00 pm | Dev R | Application 1 | Application 2 | dr@mail.com<br>555-555-6666<br>Video: Devr1 |
| 2:30-3:30 pm | Mike L | Finance | Device 1 | MikeL@email.com<br>703-777-7777 |

As illustrated in the example of Table 1, there may be three specialists assigned to cover the 1:00 pm-3:30 pm time block range on a particular day. Each specialist may have their own expertise (specialty) and contact information. As noted above, some specialists may share the same phone numbers or other contact information. Different specialists may be available to provide customer support over various types of communication channels. The example communication channels include email, phone, video chat, and text chat. Based on the customer support record 120, DOA 102 may determine how to handle and/or route the support request 104.

In an embodiment, DOA 102 may determine a request type 116 and/or channel type 118 over which a support request 104 is received. Request type 116 may indicate a department or topic for which customer 114 is seeking support. In an embodiment, if support request 104 includes a textual (e.g., SMS, e-mail, or chat) message, then DOA 102 may parse the message for keywords indicating an area about which customer 114 is seeking support. For example, words such as "accounting", "bill," "return," or "refund" may indicate a request type 116 for accounting. While words such as "flickering," "not working," "disconnected" may be identified as a technical support request type 116.

In another embodiment, request type 116 may be identified based on the phone number customer 114 called used to reach DOA 102, or may be received from the automated system which transfers support request 104 to DOA 102. For example, a company may provide a first telephone number as a general helpline, and a second number may be a technical helpline. Or, for example, request type 116 may be determined based on how customer 114 responds to various prompts in an automated call-in system. In another embodiment, request type 116 may correspond to the email address or chat ID or interface that a user used to contact a particular company.

In an embodiment, if there is no specialist 110 with a particular expertise or specialty that specifically corresponds to the request type 116, then DOA 102 may either route the support request 104 to any on-duty specialist 110 or to an answer machine or messaging system where the customer 114 can leave a message and receive a later call or contact back.

Channel type 118 may be an identification of which communication channel customer 114 used to contact or reach DOA 102. Example channel types 118 may include telephone, text, chat, video chat, and email. As illustrated in Table 1, some support specialists may only be available using particular communication channels. In an embodiment, DOA 102 may route support request 104 to the appropriate specialist 110 based in part on the communication channel type 118 by which customer 114 contacts DOA 102.

Using current support record 120 and support request type 116 and/or channel type 118, DOA 102 may route support request 104 to any of a plurality of support devices 108A, 108B that are being operated by support specialists 110A, 110B. This routing may provide for a channel of communication 124 directly between a specialist 110A and customer 114. For example, if customer 114 calls in with a support request 104, channel 124 may be established as a result of forwarding the phone call to the telephone number of specialist 110A. Or, for example, channel 124 may be a textual or video or chat channel established between specialist 110A and customer 114.

As noted above, support record 120 may be compiled by DOA 102 through matching or joining the information received from different data sources (e.g., address book 122 and schedule 112). One of the advantages of compiling support record 120 from different sources is that each source can be updated independently, and less information needs to be provided by the person(s) providing the updates.

For example, when updating the schedule 112 from Table 1, if Dev R needs to have Tom Z replace him from 2:30-3:00 pm (which may be a type of duty request 126), then he can update schedule 112 by entering Tom Z's name or ID number. Then, rather than needing to find and manually enter Tom Z's contact information, DOA 102 may automatically identify Tom Z's contact information (for that timeframe) in address book 122 and import that contact information directly into support record 120. If, for example, Tom Z's information cannot be identified in address book 122, DOA 102 may prompt an error when the schedule 112 is trying to be updated and request contact information for one or more communication channels.

In an embodiment, DOA 102 may prompt Tom Z for confirmation before updating schedule 112. For example, DOA 102 may wait for Tom Z to confirm (by phone, chat, or email) that he is available in the new time slot before updating support record 120. Similarly, if Dev R's phone number or email address is updated in address book 122, this information is automatically imported into support record 120 by DOA 102, without needing to also explicitly update schedule 112.

In an embodiment, requests such as updating schedule 112, address book 122, or other requests made by specialists or other employees of a company are duty requests 126. DOA 102 may be configured to automatically handle duty requests 126 from specialists 110. For example, DOA 102 may identify that the request type 116 is a duty request 126 based on the phone number or support device 108B from which the duty request 126 is received. In an embodiment, any phone number that is associated with an employee of a company or begins with a particular prefix 703-512-xxxs may be identified as a duty request 126.

Once a request is identified as a duty request 126, DOA 102 may provide an automated system by which specialist 110B may request support record 120 information, or update schedule 112 and/or address book 122. In an embodiment, DOA 102 may request, receive (through push or pull commands) updates from address book 122 and/or schedule 112 after a specialist 110B request to update either data source has been processed. This may enable DOA 102 to maintain a real-time, up-to-date, support record 120. Or, for example, DOA 102 may ping or send reminders to specialists 110 when their shift is about to begin or end.

Figure 2:
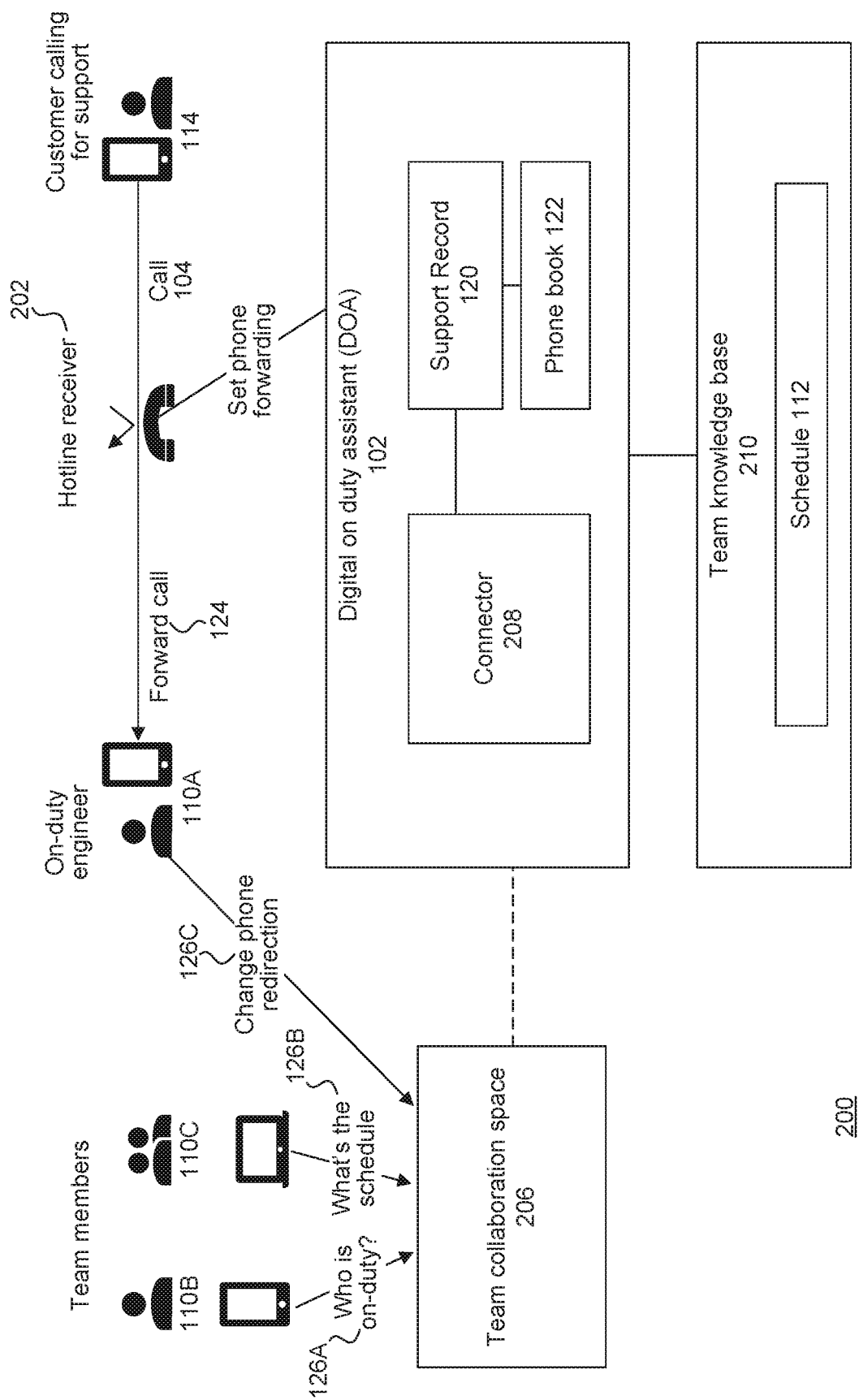
FIG. 2 is another block diagram illustrating example functionality for providing a digital on-duty assistant (DOA), according to some embodiments.

FIG. 2 is another block diagram 200 illustrating example functionality for providing a digital on-duty assistant (DOA) 102, according to some embodiments. The example of FIG. 2 illustrates an example telephone call support embodiment of the DOA 102 system described herein. A customer 114 may call 104 a customer support number for help with operating a device (not shown) they purchased from a particular company.

The helpline telephone number may be directed to a hotline receiver 202. In an embodiment, hotline receiver 202 may be an IP (Internet Protocol) compatible phone. Hotline receiver 202 may be configured to field numerous calls from different customers 114 simultaneously and redirect or route the phone calls to any other number. In an embodiment, DOA 102 may be communicatively coupled to provide or modify the call forwarding numbers of the hotline receiver 202. Then, for example, when a call 104 is received from a customer 114, hotline receiver 202 may automatically forward 124 the call 104 to the appropriate on-duty engineer 110A.

In an embodiment, DOA 102 may receive an on-duty schedule 112 indicating which on-duty engineer 110A is available at the current time (when call 104 is received) to handle or receive customer support requests 104 by telephone. Schedule 112 may be retrieved from a company or team database or knowledge base 210. In an embodiment, knowledge base 210 may include a scheduling application that a particular organization uses to schedule employees work schedules, including specialist work schedules.

In an embodiment, if instead of a phone call, the customer 114 contacted a particular chat ID for a company, then DOA 102 may forward 124 the chat to the on-duty engineer that is available to receive and respond to chat requests 104, which may be the same or different engineer 110A that receives telephone inquiries.

Three example duty requests 126A, 126B, and 126C are illustrated in the example of FIG. 2. In an embodiment, on-duty engineer 110A may need to unexpectedly take off of work to attend to a personal matter, in doing so engineer 110A may submit a change phone redirection request 126C to a team collaboration space 206.

The request 126C may be a request to identify any other available engineer that can cover the requesting engineer's 110A shift during a specified period of time. In an embodiment, any of engineers 110B or 110C may respond to the request 126C and confirm their availability. Or, for example, DOA 102 may return a list of one or more engineers who are available identified schedule 112. Or, for example, DOA 102 may select another engineer 110B, 110C who is available, and update support record 120 accordingly with the engineer's contact information. In another embodiment, request 126C may include the name or ID of another engineer who is handling the requesting engineer's shift for a specified period of time. DOA 102 may then import the new engineer's contact information from phone book 122.

In an embodiment, DOA 102 may send a confirmation notification to both the requesting engineer 110A and the selected new engineer 110C to indicate the update. And then, for example, subsequent phone calls 104 may be re-directed to the newly selected engineer 110C.

In an embodiment, request 126C may only be for an hour or other specified period of time. Then, for example, after the expiration of the period of time, or subsequent message 126C from engineer 110A that they are returned and are available to resume their post, DOA 102 may then update the call forwarding of hotline receiver 202 accordingly.

Other requests which may be received from other employees (including other on-duty or off duty engineers) 110B, 110C include a query such as who is on duty 126A, and what is the schedule 126B. In an embodiment, these may be submitted to a team collaboration space 206.

Team collaboration space 206 may include an app or program that allows different people to post and/or communicate (chat, email) with one another publicly and/or privately. In an embodiment, team collaboration space may include a log of communications between different people or members across one or more teams or organizations. An example team collaboration space 206 includes, but is not limited to, SLACK (developed by Slack Technologies).

In an embodiment, DOA 102 may include a connector 208. Connector 208 may access team collaboration space 206 using an application programming interface (API). Connector 208 may listen to or watch communications to identify duty requests 126A, 126B, 126C from the communications in team collaboration space 206. For example, connector 208 may try and identify keywords or phrases such as "schedule" "what is my schedule" "who is on-duty", etc. In an embodiment, connector 208 may include its own handle in team collaboration space 206 such that specialists 110 may communicate directly with DOA 102 (which may include a chat bot type response system).

Upon detecting a duty request 126, DOA 102 may receive and respond to duty requests 126A-C through public or private messages through team collaboration space which may be accessible from the various devices accessible to the engineers or other team members 110A, 110B, 110C.

Figure 3:
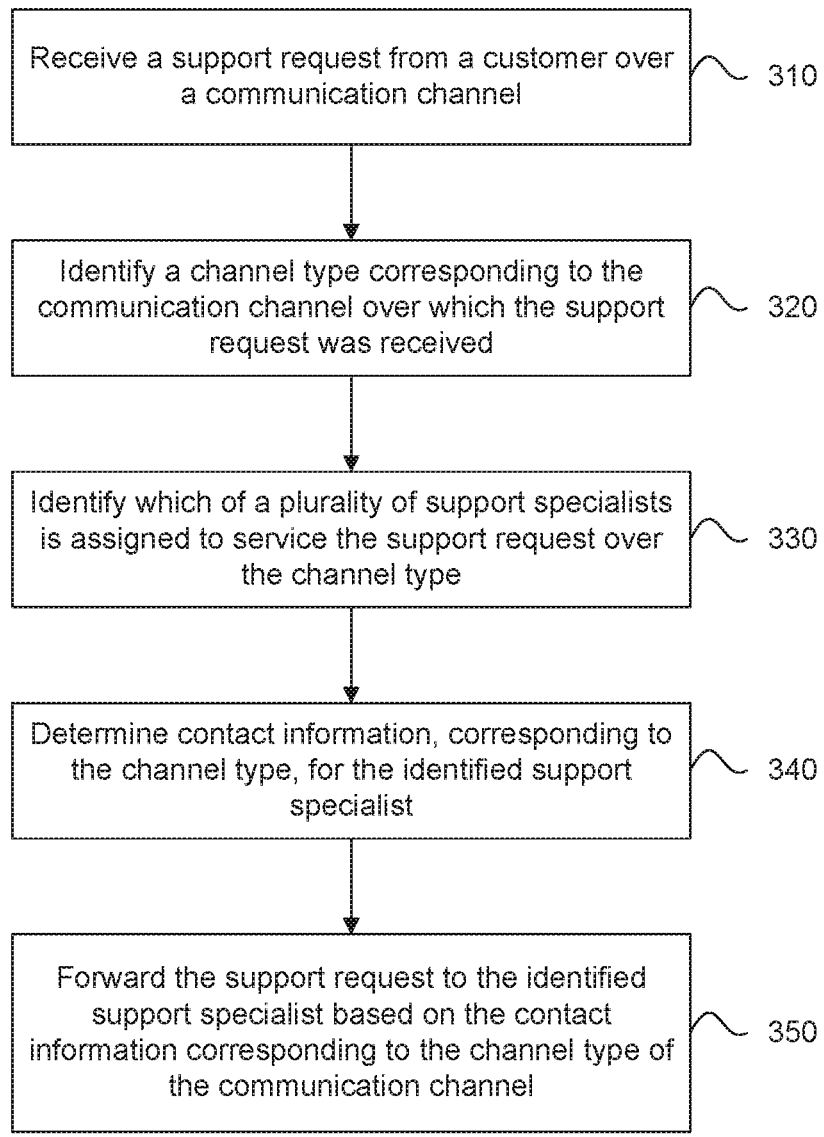
FIG. 3 is a flowchart illustrating example operations for providing a digital on-duty assistant (DOA) system, according to some embodiments.

FIG. 3 is a flowchart 300 illustrating example operations for providing a digital on-duty assistant (DOA) system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to the example embodiments.

In 310, a support request is received from a customer over a communication channel. For example, in FIG. 2, hotline receiver 202 may receive a phone call 104 from a customer 114. The communication channel may be a telephone line, but in other embodiments may include a textual or video chat request.

In 320, a channel type corresponding to the communication channel over which the support request was received. For example, in FIG. 1, DOA 102 may identify that the support request 104 was received through a phone line (channel type 118). In an embodiment, DOA 102 may only be configured to receive requests 104 over phone lines and thus no specific channel type determination 118 may be made, since only one channel exists.

In 330, which of a plurality of support specialists is assigned to service the support request over the channel type is identified. For example, in FIG. 2, DOA 102 may determine from support record 120 which engineer(s) 110A is on duty when call 104 is received. In an embodiment, this determination may be made prior to call 104 being received.

In 340, contact information, corresponding to the channel type, for the identified support specialist is determined. For example, in FIG. 2, DOA 102 may determine from support record 120 the phone number for the on-duty engineer 110A. The phone number may be a personal phone number, an office phone, or may include multiple different phone numbers any one of which may be used.

In 350, the support request is forwarded to the identified support specialist based on the contact information corresponding to the channel type of the communication channel. For example, in FIG. 2, DOA 102 may configure hotline receiver 202 to automatically forward calls 124 directly to the on-duty engineer 110 (as determined from support record 120). Engineer 110A may then speak directly with customer 114.

In an embodiment, this forward setting of hotline receiver 202 may be performed by DOA 102 through an API and may be performed prior to receiving call 104 and each time schedule 112 is updated or when a new on-duty engineer 110A becomes available, or a previously available on-duty engineer 110A is no longer available.

Figure 4:
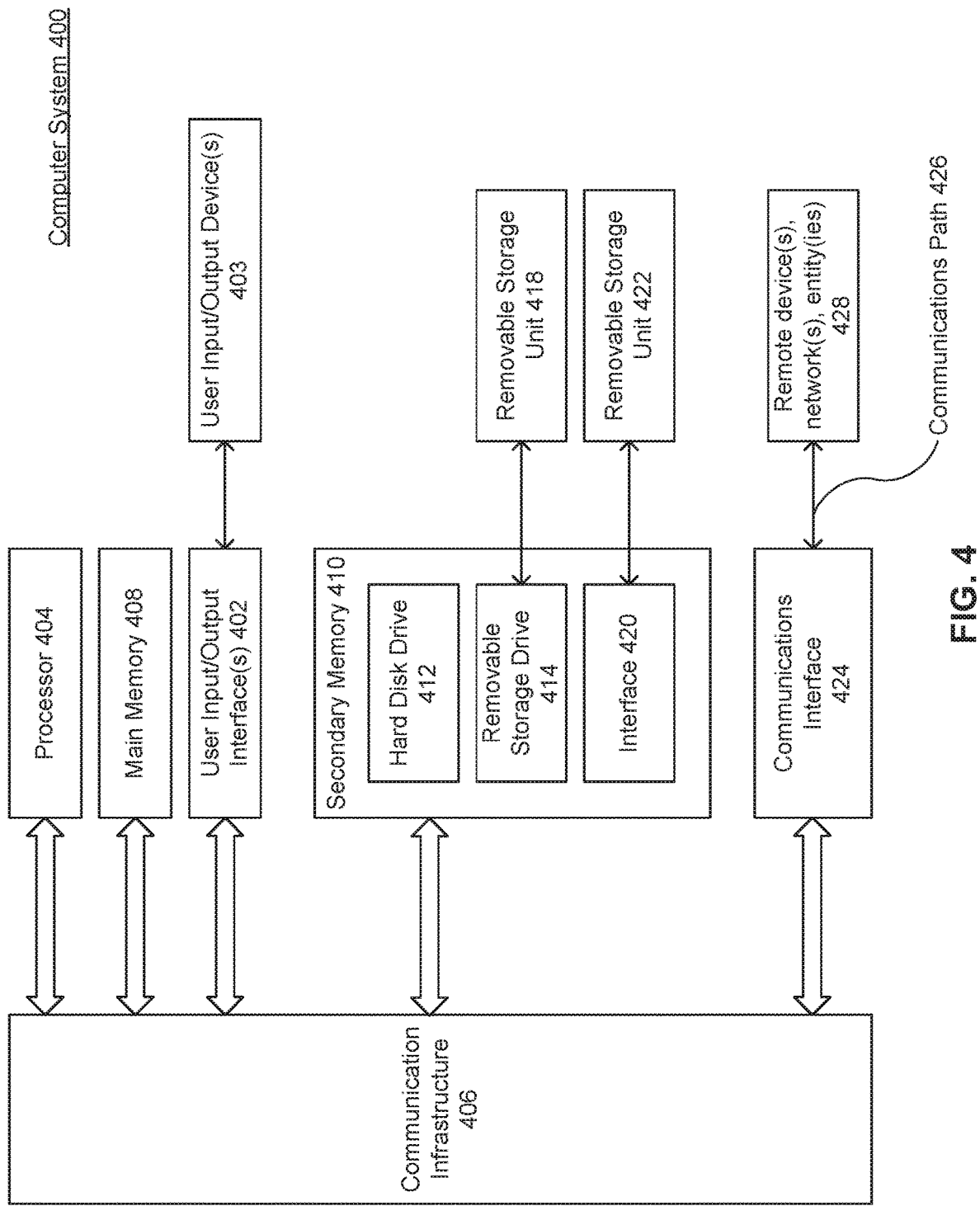
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving, at a computing device, a support request over a communication channel, wherein the computing device is configured to route the support request to one of a plurality of support specialists;
   determining, by the computing device, that the support request is from one of the plurality of support specialists; and
   providing, responsive to the determination that the support request is from one of the plurality of support specialists, a schedule of the support specialist associated with the support request.

2. The method of claim 1, wherein a first one of the plurality of support specialists is assigned to service a first channel type, and wherein a second one of the plurality of support specialists is assigned to service a second channel type.

3. The method of claim 2, further comprising:
   identifying, by the computing device, whether the first channel type is a telephone channel, a video channel, or a chat messaging channel.

4. The method of claim 1, wherein the providing comprises:
   identifying one or more keywords in the support request; and automatically providing the schedule based on the one or more keywords.

5. The method of claim 4, wherein the one or more keywords corresponds to the customer requesting to update the schedule from a first specialist to a second specialist.

6. The method of claim 5, further comprising:
automatically identifying new contact information for the second specialist; and
automatically updating, responsive to the request to update the identified support specialist, the schedule, wherein a subsequent support request is directed to the second specialist.

7. The method of claim 1, wherein the schedule indicates a plurality of communications channels over which each of the plurality of specialists can be contacted over varying periods of time.

8. A system comprising:
a memory; and
at least one processor coupled to the memory and configured to perform operations comprising:
receiving, at the at least one processor, a support request over a communication channel, wherein the computing device is configured to route the support request to one of a plurality of support specialists;
determining, by the at least one processor, that the support request is from one of the plurality of support specialists; and
providing, responsive to the determination that the support request is from one of the plurality of support specialists, a schedule of the support specialist associated with the support request.

9. The system of claim 8, wherein a first one of the plurality of support specialists is assigned to service a first channel type, and wherein a second one of the plurality of support specialists is assigned to service a second channel type.

10. The system of claim 9, further comprising:
identifying whether the first channel type is a telephone channel, a video channel, or a chat messaging channel.

11. The system of claim 8, wherein the providing comprises:
receiving the support request over a chat messaging channel;
identifying one or more keywords in the support request; and
automatically providing the schedule based on the one or more keywords.

12. The system of claim 11, wherein the one or more keywords corresponds to the customer requesting to update the schedule from a first specialist to a second specialist.

13. The system of claim 12, the operations further comprising:
automatically identifying new contact information for the second specialist; and
automatically updating, responsive to the request to update the identified support specialist, a support schedule, wherein a subsequent support request is directed to the second specialist.

14. A non-transitory computer-readable device having instructions stored thereon that, when executed by at least one computing device, cause the at least one computing device to perform operations comprising:
receiving, at the at least one computing device, a support request over a communication channel, wherein the computing device is configured to route the support request to one of a plurality of support specialists;
determining, by the at least one computing device, that the support request is from one of the plurality of support specialists; and
providing, responsive to the determination that the support request is from one of the plurality of support specialists, a schedule of the support specialist associated with the support request.

15. The device of claim 14, wherein a first one of the plurality of support specialists is assigned to service a first channel type, and wherein a second one of the plurality of support specialists is assigned to service a second channel type.

16. The device of claim 15, further comprising:
identifying whether the first channel type is a telephone channel, a video channel, or a chat messaging channel.

17. The device of claim 16, wherein the providing comprises:
receiving the support request over the chat messaging channel;
identifying one or more keywords in the support request; and
automatically providing the schedule based on the one or more keywords.

18. The device of claim 17, wherein the one or more keywords corresponds to the customer requesting to update the schedule from a first specialist to a second specialist.

* * * * *